J. M. Hackney,
Filter.
No. 103,173.      Patented May 17, 1870.
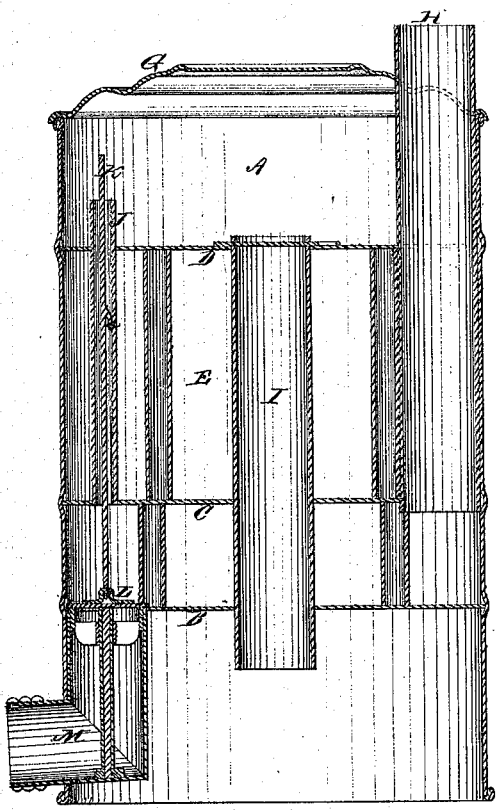
Witnesses
Jno. A. Ellis
J. T. White
Inventor
Jno. M. Hackney
Per
J. H. Alexander
Attys

United States Patent Office.

JOHN M. HACKNEY, OF DANVILLE, KENTUCKY.

Letters Patent No. 103,173, dated May 17, 1870.

IMPROVEMENT IN FILTERS.

The Schedule referred to in these Letters Patent and making part of the same.

*To all whom it may concern:*

Be it known that I, JOHN M. HACKNEY, of Danville, in the county of Boyle and in the State of Kentucky, have invented certain new and useful Improvements in Anti-freezing Filters; and I do hereby declare that the following is a full, clear, and exact description thereof, reference being had to the accompanying drawings and to the letters of reference marked thereon, which form a part of this specification.

The nature of my invention consists in the construction and arrangement of an "anti-freezing filter for cisterns," as will be hereinafter fully set forth.

In order to enable others skilled in the art to which my invention appertains to make and use the same, I will now proceed to describe its construction and operation, referring to the annexed drawings, which represent a longitudinal vertical section of my filter.

A represents the outside cylinder, within which is placed a bottom, B, and two sieves, C and D.

Between the bottom B and the lower sieve C, is an open space, while in the space between the lower sieve C and the upper one D is placed some suitable kind of filtering material, E.

A lid, G, is fitted tightly on top of the cylinder A.

Through this lid passes the receiving-pipe H, which leads downward through the two sieves and the filtering material, opening or ending in the space below the lower sieve.

The water entering fills this space, and rises through the filtering material E, and is discharged into the cistern, through a central discharge-pipe, I, leading from the center of the upper sieve D downward through the bottom B.

Through the filtering material E, opening into the space above the bottom B, is an air-tube, J, which admits enough air to let the water run freely.

Through this air-tube runs a rod, K, to operate a valve, L, in the bottom B, said valve leading into an elbow, M, for the purpose of turning off the water, so as not to flow into the cistern. This valve is so constructed that, when shut, it will allow sufficient water to leak through, so as to prevent it from freezing.

On the rod K is a catch, *a*, which hooks on the upper sieve D, to hold the valve L open.

Having thus fully described my invention,

What I claim as new, and desire to secure by Letters Patent, is—

The arrangement, within the cylinder A, of the bottom B, sieves C D, filtering material E, receiving-pipe H, and discharge-pipe I, all substantially as shown and described.

In testimony that I claim the foregoing as my own, I affix my signature in presence of two witnesses.

J. M. HACKNEY.

Witnesses:
GEO. W. COLLINS,
GEORGE W. WELSH.